E. J. WINTER.
DISTILLING APPARATUS.
APPLICATION FILED JUNE 13, 1918.

1,427,886.

Patented Sept. 5, 1922.
3 SHEETS—SHEET 1.

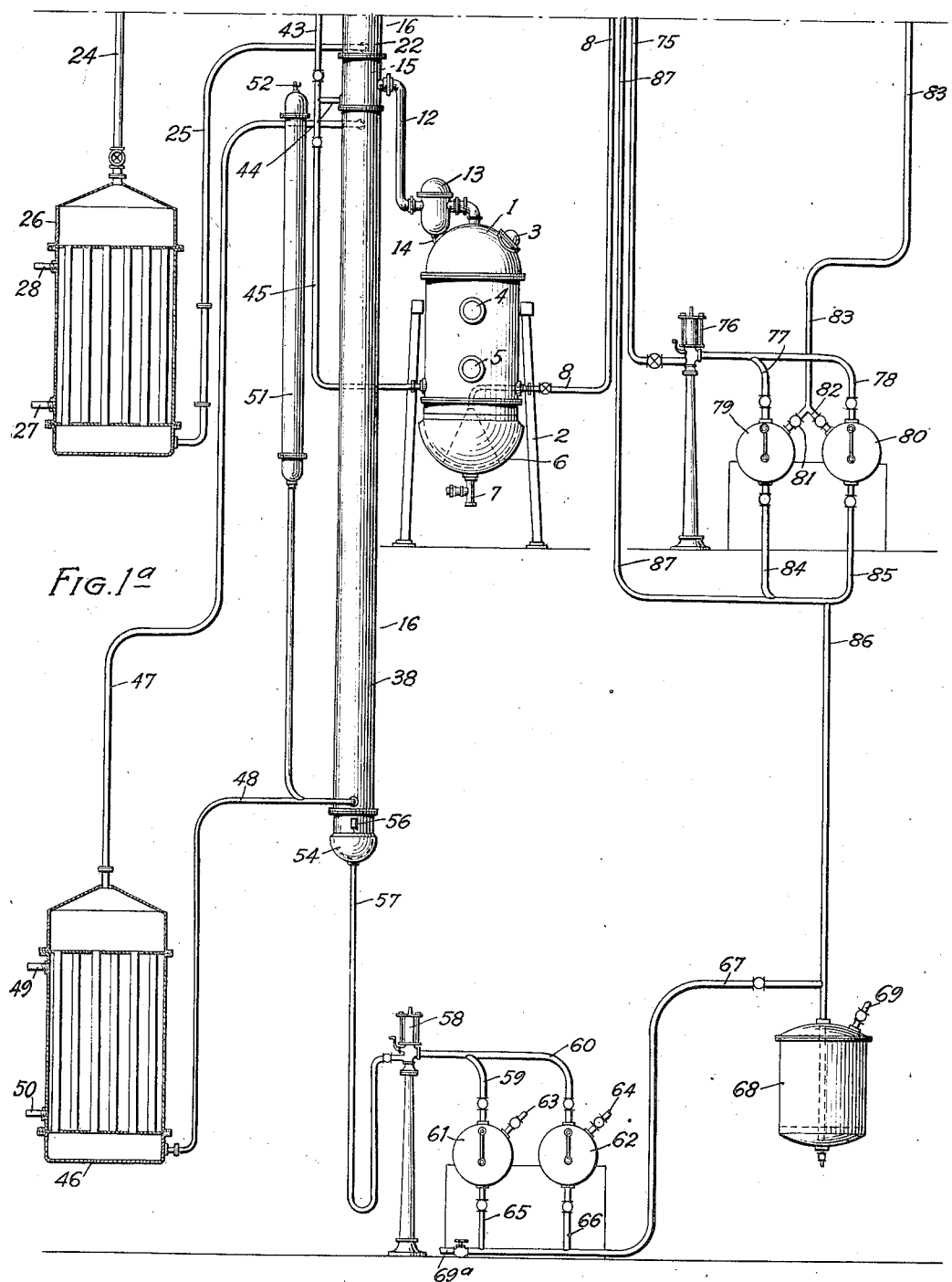
Fig. 1ᵃ

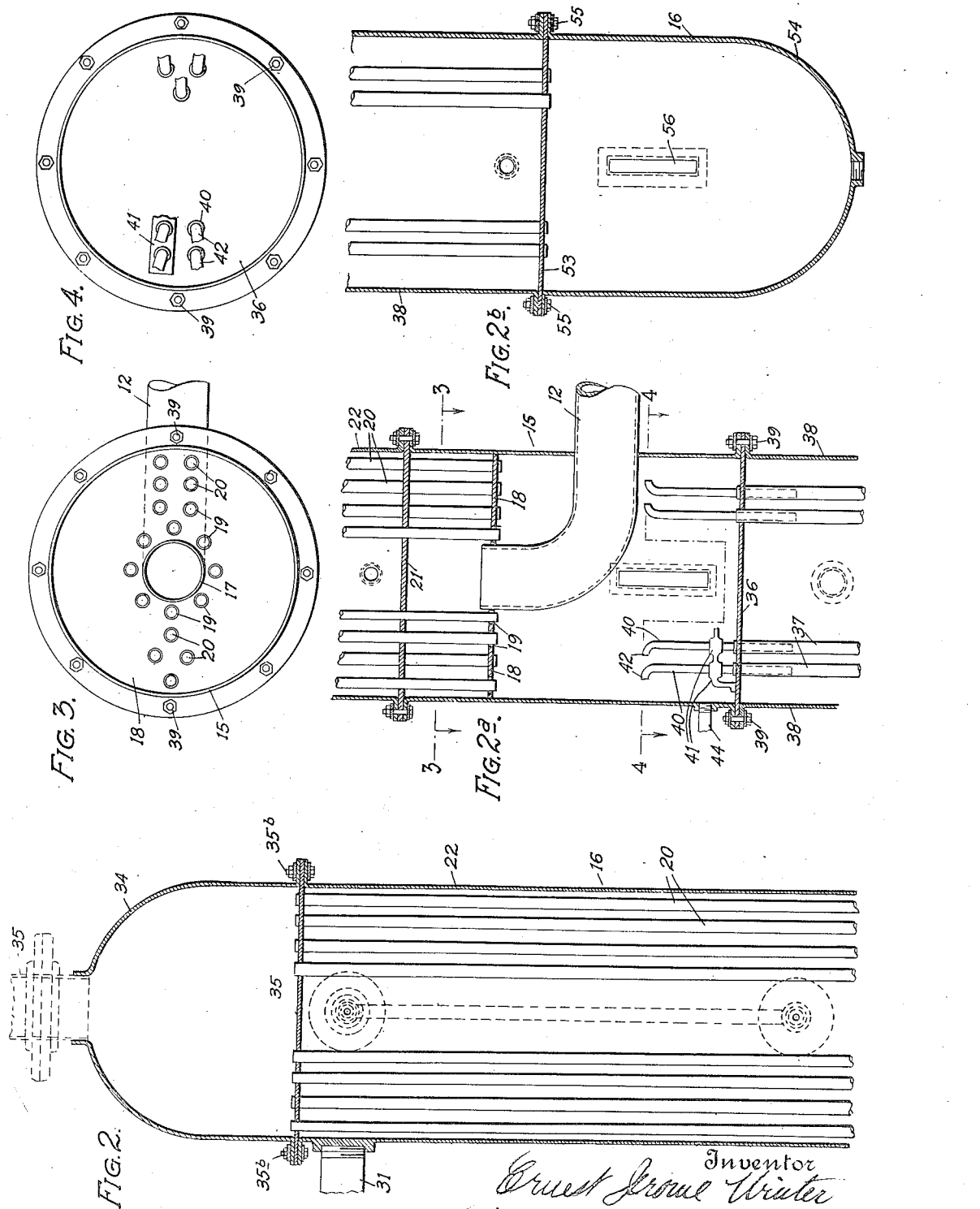

Patented Sept. 5, 1922.

1,427,886

UNITED STATES PATENT OFFICE.

ERNEST JEROME WINTER, OF BALTIMORE, MARYLAND, ASSIGNOR TO U. S. INDUSTRIAL ALCOHOL CO., A CORPORATION OF WEST VIRGINIA.

DISTILLING APPARATUS.

Application filed June 13, 1918. Serial No. 239,754.

*To all whom it may concern:*

Be it known that I, ERNEST JEROME WINTER, of Baltimore, in the State of Maryland, have invented a certain new and useful Improvement in Distilling Apparatus, and do hereby declare that the following is a full, clear, and exact description thereof.

My invention relates particularly to an apparatus adapted to be used in distilling, but it has reference especially to the distillation of alcohol.

The object of my invention is to provide an apparatus by which distillates of a high degree of purity and strength may be obtained, and especially to provide a distilling apparatus by which a very high proof alcohol, or absolute alcohol, may be obtained.

A further object of my invention is to provide an apparatus of the above character in which the distillates referred to may be readily obtained at a minimum cost and with a minimum amount of labor, the corresponding process being claimed in my copending application, S. N. 239,753.

Hitherto, in the distillation of alcohol, owing to the use of atmospheric pressures and columns, alcohol of a greater strength than 95.4% could not be obtained, for the reason that at atmospheric pressures, when the strength of the alcohol being distilled or rectified has reached 95.4%, the vapor produced under these conditions would have the same strength. Furthermore, in the said processes, if any attempt were made to apply a vacuum to pan columns, this would be ineffective because of the fact that the columns would prevent the vacuum from acting to any great degree below the first few pans at the top of the column connected with the vacuum pump, inasmuch as there are liquid seals between the several pans which gradually increase the head of liquid between the upper and lower portions of each column.

The object of my invention is, therefore, to obviate the disadvantages inherent in previous apparatuses provided for distilling alcohol, and particularly to provide an apparatus in which a vacuum may be readily applied, so that advantage may be taken of the fact that under the influence of a vacuum the vapors obtained from alcohol having a strength of 95.4% or higher contain even a larger percentage of alcohol than the liquid from which said vapors are derived.

Still another object of my invention is to provide an apparatus of this nature in which a body of alcohol of increasing strength is brought into contact with a body of vapor, also of increasing strength but which has a lower strength than the body of vapor that would be derived from and be in equilibrium with the portion of said body of alcohol with which it would be in contact at any one time.

That is to say, the object of my invention is particularly to provide an apparatus of this kind in which there is an advancing film of alcohol, having a progressively increasing strength toward its rearmost portion, which is brought in contact with an advancing current of alcohol vapors having a strength which increases towards its foremost portion, the two currents of liquid and vapors being conveyed in opposite directions, and the strength of the alcohol vapors at any given point being less than the strength of the vapor which would be in equilibrium with the liquid at that point, but greater than the strength of the liquid itself, so that as the current of vapor advances it will become richer in alcohol, while the current of liquid as it advances will become poorer in alcohol.

Another object of my invention is to provide an apparatus to bring about this action in a body of alcohol vapors obtained from an alcohol still and to furthermore treat the weak alcohol liquors thus obtained in a similar manner so as to bring up their strength to the strength of the body of alcohol vapors originally treated, so that they may thereafter be united with a further quantity of the alcohol vapors from the still and treated in a similar manner to produce high proof alcohol.

Further objects of my invention will appear from the detailed description thereof contained hereinafter.

While my invention is capable of being carried out in many different ways, for the purpose of illustration I have shown only one form of my apparatus in the accompanying drawings, in which—

Figures 1 and 1ª show a diagrammatic representation of an apparatus that may be used in connection with my invention, the same being shown somewhat diagrammatically;

Figures 2, 2ª and 2ᵇ show vertical sections of different parts of the tubular rectifier used therewith;

Figure 3 is a horizontal section of the same taken on line 3—3;

Figure 4 is a horizontal section of the same taken on line 4—4;

Figure 1:
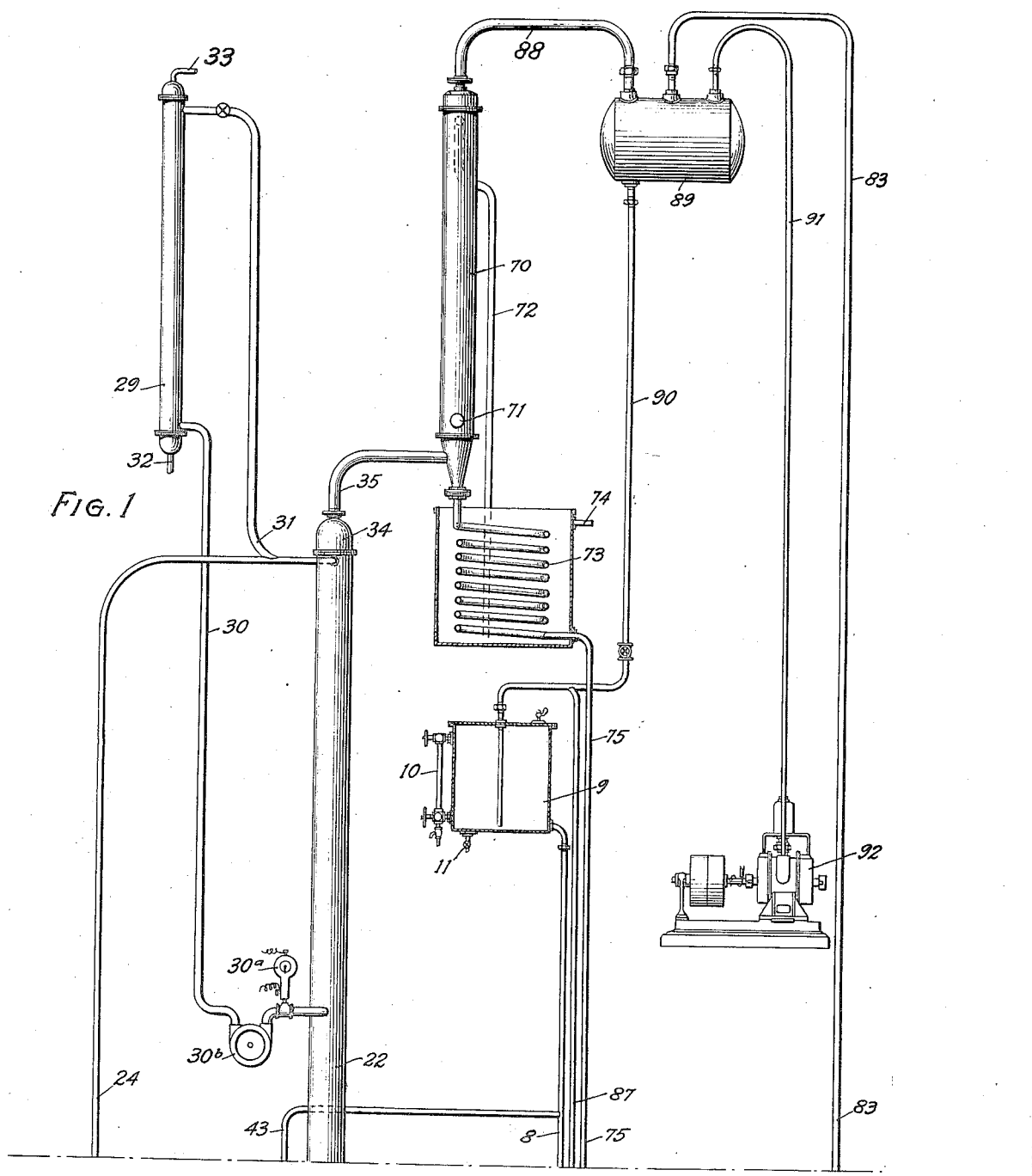

In the drawings, I have shown an alcohol still 1, carried upon any suitable framework 2, and which is provided with a manhole 3, two glass windows 4 and 5 for viewing the progress of the distillation, a steam heating jacket 6 provided with a steam inlet pipe 7, a valved feed pipe 8 for the inlet of weak alcohol, as for example 35% alcohol, the same being connected with a supply tank 9, having a gauge 10, and a drain-pipe 11. A vapor outlet pipe 12 is provided at the top of the still 1, the same being connected with a foam trap 13, having a return pipe 14 to said still. The vapor outlet pipe 12 leads into a middle section 15 of the tubular rectifier 16, and has at its extreme end an upwardly bent portion 17, which passes through a diaphragm 18 extending across said middle section 15, which diaphragm 18 has a plurality of holes 19 to receive the lowermost ends of a number of vertically arranged tubes 20 extending upwardly in said rectifier 16. The holes 19 are larger than the external diameters of the tubes 20, so as to provide outlets for the alcohol vapors in a downward direction through the diaphragm 18, in order to effectively distribute the alcohol vapors in the middle section 15 prior to the entry of the same into the lower ends of the tubes 20. Said tubes 20 are held in place near their lower ends by means of a plate 21, through which they pass, and in which they are tightly secured, said plate 21 being located at the upper end of the middle section 15, and being secured thereto, as well as to an upper rectifier section 22, by means of bolts 23. Said upper rectifier section 22 is connected by means of valved pipes 24 and 25 to a preheater 26, which is adapted to be supplied with steam by means of pipes 27 and 28. The preheater is designed to be used only when starting the operation of the apparatus, so as to provide in the upper section of the rectifier 22 the desired temperature from the beginning of the operation thereof. After the desired temperature has been reached, the preheater 26 will be thrown out of operation by the closing of its valves, and thereafter a cooler 29 will be brought into operation, which cooler is connected by valved pipes 30 and 31 to said upper section 22, said pipe 30 having therein a thermostat 30ª and a circulating pump 30ᵇ which circulates a current of cooling water in the upper section 22. The cooler 29 is supplied with cold water by means of pipes 32 and 33. At the upper end of the upper section 22, there is a cover 34, having a vapor outlet pipe 35 secured to the top thereof. Between the cover 34 and the upper section 22 there is a plate 35ª, in which the upper ends of the tubes 20 are secured, said plate 35ª being secured to the cover 34 and the upper section 22 by means of bolts 35ᵇ. Any liquid that is condensed in the middle section of the rectifier 15 above the diaphragm 18 and the liquid that is condensed in the tubes 20 is received upon the upper surface of a plate 36, located at the bottom of the middle section 15, which plate 36 has secured therein the upper ends of a number of tubes 37, that extend downwardly into a lower section 38, which is secured to the plate 36 and the middle section 15 by bolts 39. In order to feed the liquid downwardly in the form of a film in the tubes 37, the upper ends of said tubes are provided with smaller L-shaped tubes 40 fitting therein and supported in place by brackets 41 and which have upper horizontally-directed portions 42 to prevent the entry of the descending liquids into the same, while permitting the exit of the vapors ascending from the tubes 37.

Initially it is sometimes found desirable to supply a quantity of liquid into the middle section 15 without waiting for the accumulation thereof from the upper section 22, and for this purpose the tube 8 used for supplying the still 1 has a valved branch 43 connected by a tube 44 to the middle section 15, and, in order to draw off from the middle section 15, when desired, any excess of liquid at this point, said tube 44 is connected by a valved tube 45 to the still 1.

Said lower section 38 is adapted to be heated by means of a heater 46, which is connected by pipes 47 and 48 to said lower section 38, said heater 46 having pipes 49 and 50 for supplying steam thereto, while the pipe 48 is provided with an expansion tank open at its upper end to the outer air by means of a cock 52. At its lower end, the lower section 38 has a plate 53 in which the lower ends of the tubes 37 are secured, said plate 53 being connected to the lower section 38 and a bottom 54 by means of bolts 55. The bottom 54 has a window 56 to view the accumulation of liquid therein. From the lower end of the bottom 54 a sealed pipe 57 leads to a tail box 58, from which the liquid may be conducted by valved pipes 59 and 60 to water or weak alcohol receivers 61 and 62, which are provided with valved compressed air pipes 63 and 64, respectively to drive the liquid therefrom by means of valved pipes 65 and 66, respectively, through a valved pipe 67 into a reservoir 68, also supplied with compressed air by means of a valved pipe 69. Attached to the pipes 65 and 66 there is, furthermore, a valved branch outlet pipe 69a.

From the upper portion of the tubular rectifier 16 the high-proof alcohol vapors, pass out by tube 35 into a tubular condenser 70, which is arranged to be cooled by a current of water supplied through an inlet pipe 71 and drawn off by an overflow pipe 72. The condensate from the condenser 70 passes through a coil condenser 73 supplied with a current of cooling water by the pipe 72 and by an overflow pipe 74. The high proof alcohol is drawn off from the coil 73 by a pipe 75, and is thence conveyed into a tail box 76, from which it may be conveyed by valved pipes 77 and 78 to high-proof alcohol receivers 79 and 80, respectively These receivers 79 and 80 are, furthermore, provided respectively with valved pipes 81 and 82, which are connected to a valved pipe 83, adapted to apply a vacuum to said receivers. The high proof alcohol from said receivers 79 and 80 may be discharged therefrom by means of valved pipes 84 and 85, respectively, and thence by a pipe 86 into the reservoir 68, and from said reservoir by means of a pipe 87 into the supply tank 9.

Any vapors which are not condensed in the tubular condenser 70 pass outwardly from the upper portion of the same by means of a pipe 88 to a suction tank 89, from which any condensate that accumulates may be conveyed away to the supply tank 9 by means of a valved pipe 90. Said suction tank 89 is, furthermore, connected to the vacuum pipe 83 previously referred to and is, furthermore, connected by a pipe 91 to a vacuum pump 92 of any desired type.

In the operation of my apparatus, it will be understood that many different materials may be treated therein and that alcohols of many different kinds and strengths may be operated upon in accordance therewith.

For example, however, I may in the operation of my apparatus treat an aqueous ethyl alcohol containing approximately 35% of alcohol.

In order to start the operation of the apparatus, the alcohol is charged into the still 1, or may be introduced initially into the supply tank 9, in any desired manner. Furthermore, the preheater 26 will be operated to heat the upper section 22 of the rectifier to the desired temperature, that is to say a temperature depending on the vacuum, but of about 2° C. below the boiling temperature of absolute alcohol at that pressure, but as soon as this temperature has been attained and as soon as vapors are received from the still 1, it will be understood that the preheater 26 will be disconnected and the cooler 29 will be thrown into operation instead, so as to maintain said temperature substantially constant.

If it is desired to have the tubes 37 supplied with liquid from the beginning of the operation of the apparatus, a quantity of weak alcohol may be supplied thereto by means of the pipe 43, and if at this or any subsequent time the amount of liquid accumulating above the plate 36 is greater than the desired amount, this may be drawn off to a greater or less extent by means of the pipe 45 and returned to the still 1.

The vacuum pump 92 is now operated so as to produce a vacuum of not less than twenty-seven inches of mercury.

The alcohol vapors which pass out from the pipe 12 are discharged into the middle section 15 above the diaphragm 18, and are thence discharged downwardly through the openings 19 around the tubes 20, so that in this way the alcohol vapors become evenly distributed within the middle section 15, so that they will be uniformly supplied through the tubes 20. Any condensate which may accumulate above the diaphragm 18 also passes downwardly through the openings 19 and is received by the plate 36. The alcohol vapors passing into the lower ends of the tubes 20 will have a strength of approximately 82% alcohol. As these vapors pass upwardly in the tubes 20, a portion thereof will become condensed during the travel of the vapors through said tubes, so that by the time the vapors reach the upper ends of the tubes 20 there will be a descending film of condensed water and alcohol extending from the upper to the lower portion of said tubes 20.

Owing to the fact, however, that under the influence of a vacuum solutions of alcohol in water, even when approximating absolute alcohol, are in equilibrium with the vapors evolved therefrom only when said vapors contain a larger percentage of alcohol than the liquid adjacent thereto, the ascending current of vapors in the tubes 20 will become enriched in alcohol by reason of the condensation therefrom of a liquid which is lower in alcohol content than the vapors from which they were derived.

Not only is this the case, but it will be seen that as the current of vapors approaches the upper ends of the tubes 20 the condensate therefrom will be richer in alcohol than the condensate from the vapors entering the lower ends of said tubes 20, inasmuch as the condensate produced at the upper ends of the tubes 20 will be formed from vapors richer in alcohol than the vapors in the lower ends of the tubes 20 will. Therefore, the tubes 20 contain an ascending current of alcohol vapors becoming increasingly richer in alcohol as they ascend, while the inner walls of said tubes will carry a descending film of aqueous alcohol becoming progressively poorer in alcohol.

Furthermore, because of the reverse directions in which these two currents flow, the vapors at any one point in the tubes 20 will be continually brought into contact with a portion of the film of liquid which is richer in alcohol than a body of aqueous alcohol that would be in equilibrium with the vapors at said point, so that there will result an interchange between the vapors at every point with the liquid with which it is in contact which will increase the percentage of alcohol in the vapors and decrease the percentage of alcohol in the liquid. In this way the increase in the percentage of the alcohol in the current of ascending vapors will become very much accelerated.

When, therefore, the vapors leave the upper ends of the tubes 20, they will be found to very closely approximate pure alcohol, and may, for example, in the example of my invention described in detail herein be comprised of 99 or 99.5% alcohol.

The condensate which leaves the lower ends of the tubes 20 falls downwardly in the middle section 15 upon the plate 36 and may be there caused to form very thin films of liquid descending upon the inner walls of the tubes 37 by reason of the L-shaped pipes 40, which not only act to form said films, but, by reason of their shape, prevent the entry of drops of liquid into said tubes. The liquid at this point will in the example of my invention described be comprised of approximately 35% alcohol. As the films of liquid descend in the tubes 37, the heater 46 will cause a current of vapor to be formed therein, so that here again there will be an ascending current of alcohol and water vapors gradually becoming richer in alcohol by reason of their contact with the descending current of the liquid aqueous alcohol in substantially the same manner as described in connection with the operation of my invention within the upper section 22, which liquid becomes gradually poorer in alcohol until the liquid which passes out from the lower ends of the tubes 37 is comprised substantially of pure water.

The liquid which thus accumulates at the bottom of the rectifier 16 may be drawn off by the pipe 57 and received in the receivers 61 and 62, from which the same may be discharged by the pipe 69$^a$ or may be conducted into the reservoir 68. In case the liquid thus recovered is weak alcohol, it will be conducted into the reservoir 68 for further treatment in accordance with my invention, as by returning to the still 1, but in case it is comprised of substantially pure water, it will be drawn off by the pipe 69$^a$ and discharged from the apparatus.

The vapors passing out through the upper ends of the tubes 40 become commingled with the vapors supplied from the still 1 and pass upwardly through the tubes 20 for treatment in the manner which has been described above.

The vapors which pass out from the upper end of the rectifier 16 and which are comprised, as previously indicated, of vapors having a strength of 99 or 99.5% alcohol pass into the tubular condenser 70, where they are condensed, and from this point pass into the coil condenser 73, from which the condensate is conveyed by pipe 75 into the alcohol receivers 79 and 80.

If it is desired at any time to redistill the alcohol contained in the receivers 79 and 80, as in the case where it would be desired to increase the strength thereof by redistillation, said alcohol may be conveyed by the pipe 86 into the reservoir 68, from which said alcohol may be forced by compressed air into the supply tank 9. Furthermore, any vapors which are not condensed in the tubular condenser 70 and which may subsequently condense in the suction tank 89, may be conveyed to the supply tank 9 by means of the pipe 90. From this point the alcohol in the supply tank 9 may be conducted to the still 1 for redistillation, if desired.

During the distillation, the progress thereof may be determined by viewing the action of the same through the various windows, tail boxes, etc.

While I have described my invention above in detail, I wish it to be understood that many changes may be made therein without departing from the spirit of the invention. For example, by the term "still" I mean any vapor-supplying means.

I claim:

1. An apparatus comprising the combination of a still, a rectifier containing long tubes, means for keeping the latter at a predetermined temperature, a condenser and a vacuum pump connected thereto.

2. An apparatus comprising the combination of a still, a rectifier containing long vertical tubes, means for keeping the latter at a definite temperature, a condenser connected to the rectifier, and an evaporating device connected thereto.

3. An apparatus comprising the combination of a still a rectifier containing long tubes, means for keeping the latter at a definite temperature, a preheater for the said rectifier, a condenser, and an evaporating means connected thereto.

4. An apparatus comprising the combination of a still, a rectifier containing long vertical tubes, means for regulating the temperature of the rectifier, an evaporator positioned beneath the rectifier comprising long vertical tubes, means for heating the evaporator, and a condenser connected to the rectifier.

5. An apparatus comprising the combination of a still, a rectifier containing long tubes, means for regulating the temperature of the rectifier, a preheater for the latter, an evaporator positioned beneath the rectifier comprising long upwardly inclined tubes, means for heating the evaporator, and a condenser connected to the rectifier.

6. An apparatus comprising the combination of a still, a rectifier containing long tubes, means for regulating the temperature of the rectifier, an evaporator positioned beneath the rectifier comprising long upwardly inclined tubes, means for heating the evaporator, a chamber connecting the rectifier and evaporator, to which chamber the still delivers vapors, and a condenser connected to the rectifier, 7. An apparatus comprising the combination of a still, a rectifier containing long tubes, means for regulating the temperature of the rectifier, a preheater for the latter, an evaporator positioned beneath the rectifier comprising long tubes, means for heating the evaporator, a chamber connected to the rectifier and evaporator, to which chamber the still delivers vapors, a condenser connected to the rectifier, and a vacuum pump connected thereto.

8. In combination, a still, a tubular rectifier arranged in a substantially vertical position, a vapor distributor to receive the vapors from the still, said still being adapted to supply mixed vapors below the tubes of the tubular rectifier, and a tubular evaporator located below the inlet of said mixed vapors for treating the condensate received from said tubes, said distributor being constructed so as to supply the vapors from the still concentrically with the tubes of the rectifier.

9. In combination, a still, a tubular rectifier, a vapor distributor in advance of the same comprising a perforated plate through which the tubes of the rectifier loosely pass.

10. In combination, a still, a tubular rectifier, a vapor distributor in advance of the same comprising a perforated plate through which the tubes of the rectifier loosely pass, said still having a vapor discharge pipe at one side of said plate, and said tubes passing through to the other side of said plate.

11. In combination, a still, a rectifier, and a tubular evaporator adapted to receive the condensate from the rectifier having tubes of a smaller diameter located in the ends of the tubes of the evaporator to form films of liquid in said tubes.

12. In combination, a still, a rectifier and a tubular evaporator adapted to receive the condensate from the rectifier having tubes of a smaller diameter located in the ends of the tubes of the evaporator to form films of liquid in said tubes, said smaller tubes being provided with bent portions to prevent the entry of drops into the evaporator tubes.

13. In combination, a still, a rectifier and a tubular evaporator adapted to receive the condensate from the rectifier having tubes of a smaller diameter located in the outer ends of the tubes of the evaporator to form films of liquid in said tubes, said smaller tubes being provided with bent portions to prevent the entry of drops into the evaporator tubes.

14. In combination, a still, a tubular rectifier, and a preheater for the rectifier having an independent disconnectible circuit through the rectifier for heating it.

15. In combination, a still, a tubular rectifier, a preheater for the rectifier having an independent circuit therethrough, and a cooler for the rectifier adapted to be used alternatively with the preheater.

16. In combination, a still, a tubular rectifier, a tubular evaporator, a preheater for the rectifier, a cooler used alternatively therewith, and a heater for the evaporator.

17. In combination, an evaporator, a heater therefor adapted to circulate steam, and a condenser for excessive steam which is open to the outer air.

18. In combination, a still, a rectifier, a condenser, and means for producing decreased pressure attached to the condenser.

19. In combination, a still, a rectifier, a combined tubular and coil condenser, and means for producing decreased pressure attached to the condenser.

20. In combination, a tubular rectifier, a tubular evaporator located below the same, the tubes of the rectifier and evaporator being located in a vertical position, an inlet for vapors located between the same, an outlet for vapors at the top of the rectifier, and an outlet for liquid at the bottom of the evaporator, the tubular rectifier forming an upper cylindrical section, the tubular evaporator forming a lower cylindrical section, and the vapor inlet forming a central cylindrical section, said central cylindrical section being provided with a vapor distributor concentric with the tubes of the rectifier and a liquid distributor concentric with the tubes of the evaporator.

21. In combination, a still, a tubular rectifier adapted to retain a quantity of the condensed liquid in contact with the vapors from the still, means for applying decreased pressure thereto, and a condenser for the evolved vapors.

22. In combination, a still, a tubular rectifier adapted to retain a quantity of the condensed liquid in contact with the vapors from the still, means for applying decreased pressure thereto, an evaporator adapted to receive the condensate from the rectifier and return the vapors to the rectifier, and a condenser for the evolved vapors.

23. In combination, a still, a rectifier, means for condensing the vapors from the rectifier, means for collecting the liquid passing out of the rectifier, a reservoir arranged to receive the condensate and said liquid, and compressed air connections for returning the liquid from the reservoir to the still.

24. In combination, a still, a rectifier, means for condensing the vapors from the rectifier, means for collecting the liquid passing out of the rectifier, a reservoir arranged to receive the condensate and said liquid, compressed air connections for returning the liquid from the reservoir to the still, and intermediate receivers located between the reservoir and the condensing means and between the reservoir and the liquid outlet from the rectifier.

25. In combination, a still a long tubular rectifier, a condenser, a vacuum pump attached to the condenser and a suction box located in a circuit between the pump and condenser.

26. In combination, a still, a long tubular rectifier, a condenser, a vacuum pump attached to the condenser, a suction box located in a circuit between the pump and the condenser, and a supply tank connected to the box and a liquid outlet from the condenser.

27. In combination, a still, a rectifier, means for condensing the vapors from the rectifier, means for collecting the liquid passing out of the rectifier comprising a second rectifier, means for passing the vapors from the latter to the first mentioned rectifier, and a reservoir arranged to receive either the condensate or the said liquid.

In testimony that I claim the foregoing I have hereunto set my hand.

ERNEST JEROME WINTER.

Witnesses:
JOHN P. GISCHEL,
ARTHUR WRIGHT.